United States Patent [19]

Chin et al.

[11] Patent Number: 4,523,860

[45] Date of Patent: Jun. 18, 1985

[54] GAS SATURATION MONITORING SYSTEM AND METHOD

[75] Inventors: Thomas G. Chin, El Cerrito; Rudy F. Klaver, Albany; Arthur Alston, El Cerrito, all of Calif.

[73] Assignee: Chevron Research Company, San Francisco, Calif.

[21] Appl. No.: 449,679

[22] Filed: Dec. 14, 1982

[51] Int. Cl.³ .......... B01F 3/04; G01N 25/12

[52] U.S. Cl. .......... 374/27; 48/180 R; 374/10; 374/54

[58] Field of Search .......... 374/54, 27, 28, 57, 374/10, 16; 73/61.3; 340/584

[56] References Cited

U.S. PATENT DOCUMENTS

| | | | |
|---|---|---|---|
| 1,632,748 | 6/1927 | Parsons et al. | 374/27 |
| 2,623,391 | 12/1952 | Malecki | 73/338 |
| 2,904,995 | 9/1959 | Obermaier | 374/28 |
| 3,031,881 | 5/1962 | Thorson | 374/28 |
| 3,081,619 | 3/1963 | Pappas | 374/27 |
| 3,110,173 | 11/1963 | Bishop | 73/77 |
| 3,120,119 | 2/1964 | Luther | 374/27 |
| 3,173,610 | 3/1965 | Feibush et al. | 374/28 X |
| 3,239,432 | 3/1966 | Rhodes et al. | 374/27 X |
| 3,257,609 | 6/1966 | Sanford et al. | 324/425 |
| 3,495,458 | 2/1970 | Christensen | 73/338.6 |
| 3,566,676 | 3/1971 | Hays | 374/54 X |
| 3,603,135 | 9/1971 | Kawaguchi | 73/29 |
| 3,696,360 | 10/1972 | Gajewski | 340/602 |
| 4,129,250 | 12/1978 | Chaikin et al. | 236/44 A |
| 4,175,436 | 11/1979 | Crawford et al. | 73/338.6 |
| 4,222,261 | 9/1980 | Lablanc et al. | 73/29 |
| 4,240,284 | 12/1980 | Nguyen | 374/20 |
| 4,276,768 | 7/1981 | Dadachanji | 374/28 |
| 4,290,299 | 9/1981 | Pozin et al. | 374/21 |

*Primary Examiner*—Daniel M. Yasich
*Attorney, Agent, or Firm*—Burns, Doane, Swecker & Mathis

[57] ABSTRACT

A device for monitoring the amount of butane that can be safely added into a fuel gas before condensation occurs includes a dry-bulb thermocouple for measuring the temperature of the gas and a wet-bulb thermocouple for measuring the temperature of a wick soaked in the butane. For a continuous flowing process the difference in the two measured temperatures indicates the proportion of butane that can be added before saturation, and is used to regulate the flow rate of the butane. The wick is periodically flushed with butane, in order to prevent the heavy hydrocarbon components in the butane from accumulating.

11 Claims, 4 Drawing Figures

GAS SATURATION MONITORING SYSTEM AND METHOD

BACKGROUND OF THE INVENTION

The present invention relates to the monitoring of the saturation point of a gas, and more particularly to the control of the amount of a liquid fuel that is vaporized and added to a fuel gas in accordance with the saturation point of the fuel gas.

In certain applications in which a gaseous fuel is burned it is sometimes desirable to add a condensible fuel to a fuel gas to increase the quantity or the heating value of that fuel gas. For example, in refineries fuel gas (consisting of a mixture of natural gas and process gas) is often burned to provide the heat needed in various refining steps. However, the fuel gas available may sometimes be insufficient and in these cases butane is added to the fuel gas mixture. The butane is normally stored in liquid form at ambient temperature, and can be vaporized prior to adding it to the other fuel gas.

It is desirable to be able to maximize the amount of butane that is added to the fuel gas in order to minimize use of costlier fuel oil and/or to avoid reducing production due to lack of fuel. However, if too much butane is added to the fuel gas, the gas will become saturated and the excess butane will condense. Liquid in the fuel gas can cause burner flameouts and accidental fires leading to injuries and serious mishaps.

The amount of butane that can be safely added to the fuel gas is determined by monitoring the butane saturation point of the gas. In the past, the dew point of the fuel gas was measured, using either of the following methods, as an indicator of the saturation point. One of these methods uses a chilled mirror that is in contact with the gas. The mirror is cooled in a controlled fashion until condensate is detected on its surface, either visually or by means of an electro-optical device, at which point the temperature is recorded. This process can be repeated in a cyclic fashion, or the temperature can be regulated to keep a predetermined level of condensate on the mirror. Examples of this test method can be found in U.S. Pat. No. 4,276,768 and the "Standard Test Method for Water Vapor Content of Gaseous Fuels by Measurement of Dew-Point Temperature" issued by the American National Standards Institute under ASTM Designation D 1142.

Although the chilled mirror provides a direct indication of dew point temperature, in actual practice this approach has not been satisfactory as a technique for enabling the maximum amount of butane to be added to a fuel gas. One reason for this is that such systems tend to be rather complex and require continual maintenance to keep them operational.

The other method for determining the dew point of the fuel gas is to calculate it. Unlike water vapor in air, in which the dew point is strictly a function of ambient and adiabatic saturation temperatures (as well as pressure), the dew point of a fuel gas is also dependent upon the composition of the gas. Typically, some of the components of the fuel gas are soluble in the butane, and hence their concentration levels in the gas will affect the dew point. A chromatograph is used to provide a composition analysis of the fuel gas from which the dew point temperature of the gas is calculated by a computer. The main drawbacks of this method are high cost and complexity.

OBJECTS AND BRIEF SUMMARY OF THE INVENTION

It is a general object of the present invention to provide a novel system for monitoring the saturation point of a fuel gas to enable a maximum amount of a liquid to be vaporized and added to the gas without condensation.

It is a more specific object of the present invention to provide a novel system for directly determining the degree of saturation of a gas without the need for a costly composition analyzer and computing equipment.

It is another object of the present invention to provide a novel fuel gas monitoring system that can be used in-line to continually and directly monitor the degree of saturation of a fuel gas being used in a refinery or other similar processing plant.

It is a further object of the present invention to provide a novel system for automatically controlling the addition of butane to a fuel gas to maintain the butane at a maximum safe level.

In accordance with the present invention, these objects are achieved by measuring the degree of saturation of a fuel gas through a wet bulb/dry bulb comparison technique. One temperature measuring device is placed in direct contact with the fuel gas, and another temperature measuring device is in contact with a wick that is soaked in the liquid fuel, e.g. butane, and that is exposed to the fuel gas. This latter measuring device measures the adiabatic saturation temperature. The difference in the temperatures recorded by the two measuring devices relates to the rate of evaporation of the liquid fuel in the fuel gas and thereby indicates the maximum amount of fuel that can be safely added to the fuel gas before condensation will occur.

The liquid butane available in an oil refinery, as well as other liquids of commercial grade, contain heavy components that can concentrate along the wick and decrease the evaporation rate. To prevent such from occurring, the wick is periodically flushed with the liquid to prevent buildup of the heavier components. This flushing is accomplished by diverting a flow of the liquid to the top of the wick.

The advantages provided by the invention include the direct in-line measurement of the degree of saturation of the fuel gas. The measurement provides the ability to reliably control butane addition and maintain it at a safe level. The system preferably makes its measurements at the prevailing pressure of the fuel gas and the prevailing temperature of the ambient air. In contrast, the conditions bearing directly on the likelihood of condensation measurements made by the other approaches mentioned above give dew point temperature and must be converted to the prevailing conditions using additional measurements and calculations. The systems of the present invention can be easily constructed using readily available components, and is therefore both inexpensive to build and simple to maintain.

Further advantages and features of the invention will become apparent upon a perusal of the following detailed description of a preferred embodiment of the invention illustrated in the accompanying drawings.

DETAILED DESCRIPTION

Figure 1:
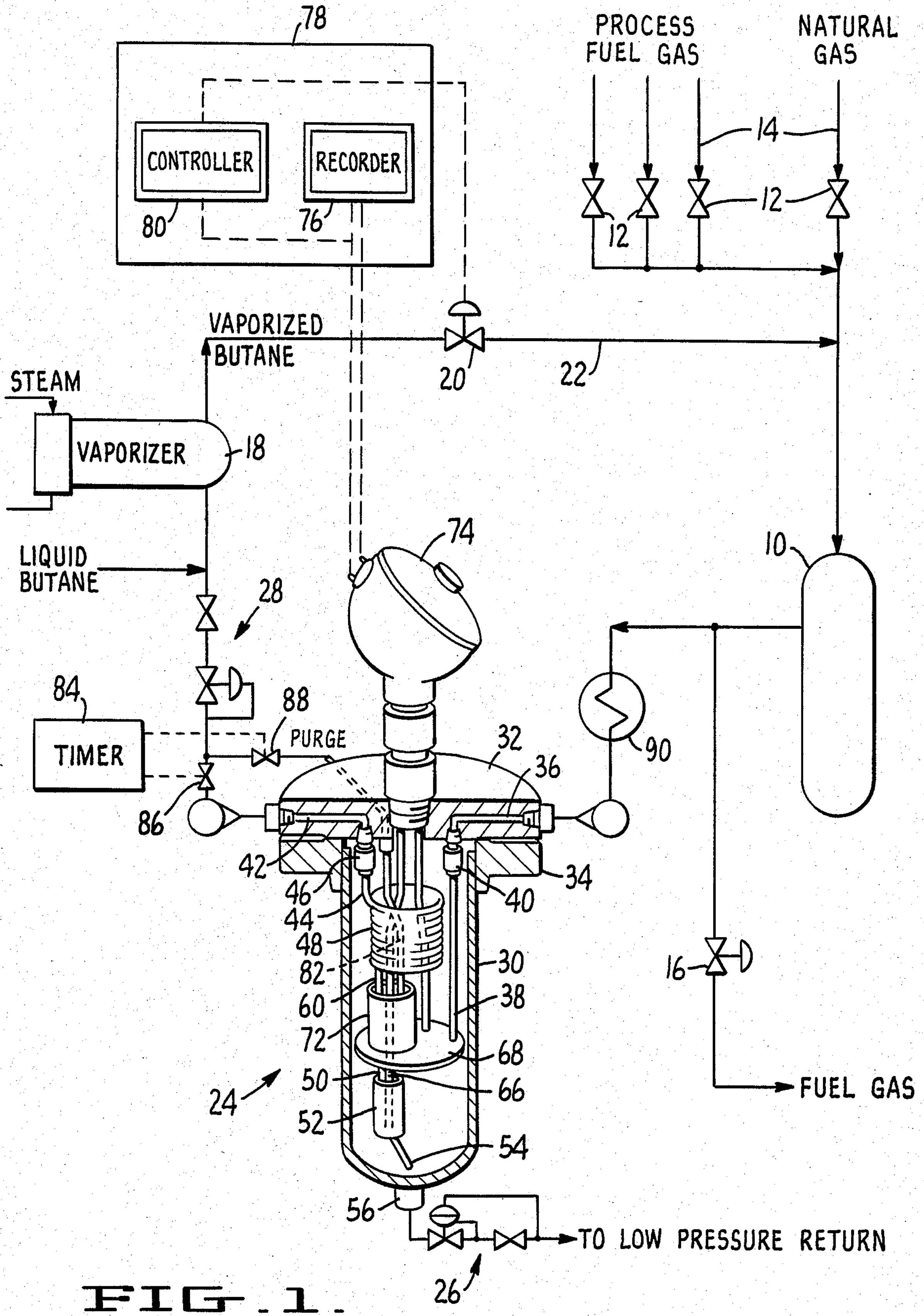
FIG. 1 is a schematic fluidic diagram of a butane injection system, illustrating the saturation monitor in a sectional perspective view.

In the following description of the preferred embodiment of the invention illustrated in the drawings, reference is made to the invention in the specific context of monitoring and controlling the addition of butane to a fuel gas. It will be appreciated by those of ordinary skill in the art, however, that the invention is not so limited, but rather can find useful application in a variety of situations where assessing the degree of saturation of a gas is desirable.

Referring to FIG. 1, a fuel gas supply system that may be used, for example, in an oil refinery is illustrated in schematic form. The fuel gas that is supplied to the burners of furnaces and other equipment in the refinery can comprise a mixture of natural gas and various gases that may be by-products of the refining process. These various gases are combined and fed to a mixing vessel 10 through appropriate control valves 12 in feed lines 14. The mixture of gases flows from the mixing vessel 10 to the burners through a suitable control valve 16.

When process fuel gas is in short supply or its calorific value is too low, it may be desirable to add butane. The butane is typically stored in a liquid state and is preferably vaporized prior to addition to the fuel gas. This vaporization is accomplished by passing the butane through a steam heated vaporizer 18, for example. The amount of butane added into the fuel gas is controlled by a suitable valve 20 in a supply line 22.

As discussed previously, it is necessary to monitor the saturation point of the fuel gas to insure that a maximum safe level of butane is not exceeded, and thereby preclude condensation in the fuel gas. In accordance with the present invention, both a sample of the fuel gas to be monitored and a small flow of liquid butane are continuously fed to the monitoring device 24. Regulation of the flow of these fluids through the monitoring device is provided by suitable control valves 26 and 28. The control valve 26 also insures that the gas in the monitor is kept at system pressure.

Figure 2:
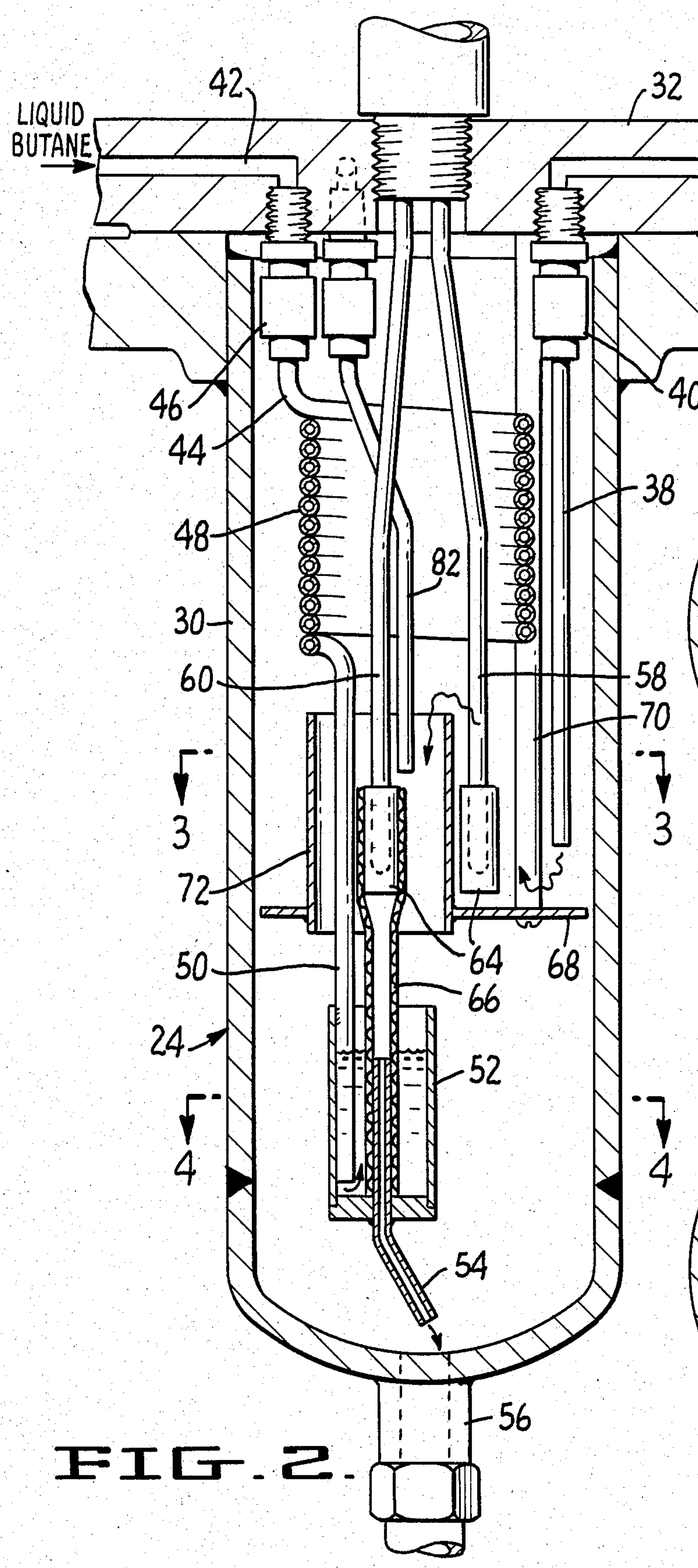
FIG. 2 is a cross-sectional side view of a butane saturation monitor contructed in accordance with the present invention.
Figure 3:
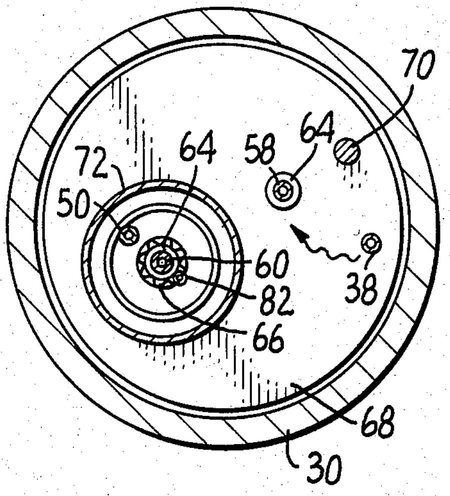
FIG. 3 is a cross-sectional top view of the monitor, taken along the section line 3—3 of FIG. 2.
Figure 4:
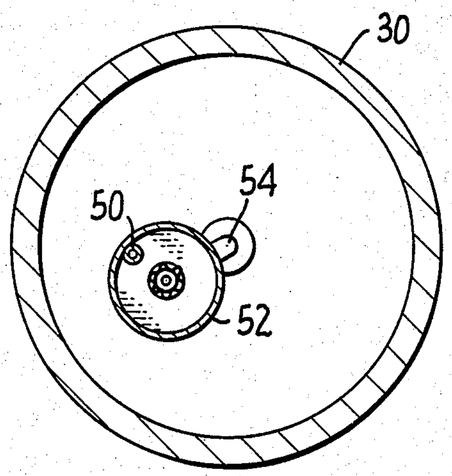
FIG. 4 is a cross-sectional top view of the monitor, taken along the section line 4—4 of FIG. 2.

The monitoring device 24 is illustrated in detail in FIGS. 2–4. It includes a cylindrical housing 30 that is closed at both ends except for suitable inlet and outlet ports. The inlet ports can be provided in a cover member 32 that is attached to the housing 30 by means of a flange 34 disposed at one end thereof. A first channel 36 extends between the periphery of the cover member 32 and the underside of the cover member, terminating within the interior of the housing 30. A tube 38 is attached to the cover member 32 at the inner end of the channel 36 by a suitable connector 40, and extends about midway down the length of the housing. The channel 36 and tube 38 provide a flow path through which the fuel gas enters the housing.

A similar channel 42 extends between the periphery of the cover member 32, at the side opposite the channel 36, and the underside of the cover member. A flow tube 44 is connected to the cover member at the inner end of the channel 42 by a suitable connector 46. The flow tube 44 includes a number of turns 48 that form a coil, and a straight section 50 that terminates near the bottom of the housing 30. The channel 42 and flow tube 44 provide a flow path through which liquid butane enters the housing.

A cup 52 is attached to the flow tube 44 at the bottom end thereof to receive the liquid butane. An overflow pipe 54 extends through the bottom of the cup and maintains a constant level of liquid in the cup. The bottom end of the overflow pipe terminates adjacent an outlet 56 at the bottom of the housing.

Two thermocouple probes 58 and 60 extend through a suitable connector 62 in the cover member 32 and into the housing 30. One probe 60 terminates directly above the cup 52, and a tubular wick 66 has its ends respectively disposed around end of this probe and the overflow pipe 54 in the cup, to thereby conduct liquid from the cup to the probe. A brass tip 64 is attached to the bottom of probe 60 to facilitate attaching the wick 66. An identical brass tip is attached to probe 58 to make the dynamic response of the thermocouples match.

A baffle within the housing comprises an apertured disc 68 that is suspended within the housing by means of a rod 70 attached to the cover member 32. The baffle also includes a tube 72 that is fitted within the aperture in the disc and surrounds the lower end of the probe 60 and the portion of the wick 66 attached thereto, as well as the straight section 50 of the flow tube 44. The baffle insures that the fuel gas emitted from the tube 38 fills the housing 30, and more particularly comes in contact with the wick 66, rather than passing straight through to the outlet 56.

In operation, the fuel gas enters the housing 30 through the channel 36 and the tube 38, and its temperature is measured by the thermocouple probe 58. The liquid butane that enters the housing is brought to the temperature of the gas as it flows through the coiled portion 48 of the flow tube 44, and fills the cup 52 to the level determined by the overflow pipe 54. The wick 66 becomes wetted by the liquid in the cup. The basis of operation of the monitor takes place at the wetted wick. Here butane evaporates into the surrounding fuel gas and the heat to support that evaporation flows in from the fuel gas. Since the two processes are inseparable and interdependent, when conditions are steady, the rate of evaporation is directly proportional to the rate of heat flow. In addition, each rate is directly proportional to its own driving force. Therefore, with the monitor the degree of saturation (the driving force for evaporation) can be inferred by simply measuring the temperature difference between the wick and the fuel gas (the driving force for heat flow). In other words, a relatively large difference in temperature would indicate that the butane is evaporating at a rapid rate and hence that the fuel gas is well below saturation, i.e. it is not close to its dew point. Conversely, a small temperature difference indicates that the fuel gas is near its dew point and that condensation of the butane would occur if slightly more butane were added.

This information can be used by the refinery operators to safely maximize the flow of butane that is being added to the fuel gas. Referring again to FIG. 1, the output signals from the thermocouple probes 58 and 60 pass through a connector assembly 74. The signal from probe 58 is the temperature of the fuel gas. The other signal is equivalent to the fuel gas temperature minus the adiabatic saturation temperature, i.e. the difference between the outputs of the two thermocouple probes. This latter signal is indicative of the margin of safety before condensation occurs in the fuel gas.

These two signals are provided to a recorder 76 in a control panel 78 or the like. An operator can periodically observe the recorded values and manually adjust the control valve 20 to maintain a proper margin of safety. If desired, the temperature difference signal can also be sent to an alarm system (not shown) that automatically alerts the operator when the temperature difference falls below a predetermined safe value.

Alternatively, the temperature difference signal can be used to automatically control the butane flow rate, since it directly indicates the proportion of butane that can be added before condensation occurs. In this regard, the difference signal can also be supplied to a butane addition controller 80 that is responsive to the temperature difference signal and adjusts the control valve 20 to maintain the butane at a maximum safe level.

The liquid butane and the fuel gas flowing from the outlet 56 in the monitor 24 can be suitably recycled into the fuel gas supply system.

In practice it has been found that heavier hydrocarbon components and impurities in the liquid butane concentrate on the wick 66. These heavier components and impurities inhibit evaporation of the butane and thus interfere with the saturation measurement. More particularly, as the heavier components accumulate on the wick, because they don't evaporate as rapidly as the lighter butane, the vapor pressure of the butane on the wick decreases. Consequently, the amount of heat that must be withdrawn from the gas to support an equilibrium condition is reduced, and the corresponding temperature measured by the thermocouple probe 60 goes up. Thus, over a period of time the difference in the temperatures measured by the two thermocouples will gradually decrease and possibly trigger a false alarm or cause the butane flow rate to be improperly lowered.

Rather than replace the wick when this occurs, it is perferable to flush the wick at periodic intervals. To this end, a third inlet is provided in the cover member 32 for the monitoring device. Referring to FIG. 2, a flow tube 82 in fluid communication with this inlet terminates just above the upper end of the wick. The flow of liquid butane is periodically diverted from the inlet channel 42 and the tube 44 to the tube 82 to cause the wick to be flushed with liquid butane that runs down the wick. For example, referring to FIG. 1, a timer 84 can automatically close a valve 86 leading to the inlet channel 42 and open a valve 88 connected to the flush tube 82 during one minute out of every five. During the remaining time in the monitoring process, the valve 86 would be open and the valve 88 closed. Other types of valve systems that function in a similar manner can also be used.

The fuel gas saturation monitor can be configured to operate in various modes such as, but not limited to, the following:

Operating Conditions of Monitor

| Mode | Pressure | Temperature | Meaning of the measured Temp. Difference |
|---|---|---|---|
| A | Same as gas | Ambient air | Degree of saturation at ambient temperature and system pressure |
| B | Constant | Constant | Degree of saturation relative to saturation at specified T and P |
| C | Constant | Ambient Air | Degree of saturation relative to saturation at specified P and ambient air temperature |

In Mode A the monitor temperature difference is the difference between the adiabatic saturation temperature at fuel gas pressure and ambient air temperature. This may be interpreted as the degree of saturation of the gas (at its pressure) relative to gas which is 100% saturated at ambient temperature and at gas pressure.

Lowering the temperature of the fuel gas raises its degree of saturation. In a typical refinery fuel gas system the fuel gas is warmer than the surrounding atmosphere. The coldest the fuel gas can become without lowering its pressure is ambient air temperature. For Mode A operation an air-cooled heat exchanger 90 can be installed in the sample line immediately upstream of the monitor to cool the gas sample to ambient air temperature. The monitor will therefore indicate the degree of saturation at the coldest temperature, and hence highest saturation condition that could exist at the fuel gas system pressure.

Lowering the pressure of fuel gas also lowers its degree of saturation. The monitor in Mode A operates at the pressure of the fuel gas system, which is the highest pressure and hence the highest saturation level that is encountered for a constant temperature. Thus the monitor automatically compensates for the effects of system pressure on degree of saturation. In other words, in Mode A operation the system automatically accounts for the "worst case" saturation level (i.e. lowest temperatures and highest pressure) present in the fuel gas supply network.

Reducing the pressure of the fuel gas adiabatically causes the temperature to drop, but the pressure effect is more dominant so the net effect is that the degree of saturation decreases.

From the foregoing it will be appreciated that the present invention provides a simple yet effective system for in-line monitoring of relative saturation of a fuel gas. Since the system gives a direct indication of relative saturation, and more particularly the amount of butane that can be added to a gas before condensation is likely to occur, it provides highly useful information without the need for complex calculations.

It will be appreciated by those of ordinary skill in the art that the present invention can be embodied in other specific forms without departing from the spirit or essential characteristics thereof. For example, thermistors could be used in place of the thermocouples. The presently disclosed embodiment is therefore considered in all respects to be illustrative and not restrictive. The scope of the invention is indicated by the appended claims rather than the foregoing description, and all changes that come within the meaning and range of equivalents thereof are intended to be embraced therein.

What is claimed is:

1. A method for monitoring the amount of a condensable fuel that can be added into a fuel gas before condensation is likely to occur, comprising the steps of:

measuring a first temperature indicative of the fuel gas temperature;

measuring a second temperature wherein the second temperature is the adiabatic saturation temperature of the condensable fuel and related to the rate at which the condensable fuel evaporates into the fuel gas;

determining a difference between the first measured temperature and the second measured temperature; and recording the determined difference for selectively determining if the fuel gas is maintained at a safe level.

2. A method of claim 1 further including the steps of adding the condensable fuel into the fuel gas and controlling the rate of addition to maintain the determined difference above a predetermined safe value.

3. The method of claim 1 further including the step of indicating when the determined difference is less than a predetermined safe value.

4. The method of claim 1 wherein the step of measuring the second temperature includes the step of soaking one end of a wick in the condensable fuel in liquid form, exposing an other end of the wick to the fuel gas, and measuring the temperature of the exposed end of the wick.

5. The method of claim 4 further including the step of periodically flushing the wick with the condensable fuel in liquid form.

6. The method of claim 1, wherein the condensable fuel is butane.

7. Apparatus for determining the amount of a condensable hydrocarbon-containing fuel needed to saturate a fuel gas, comprising:

a chamber having a first inlet for admitting the fuel gas and a second inlet for admitting the condensable fuel in liquid form;

a receptacle within said chamber for receiving liquid entering said chamber through said second inlet;

a first temperature sensing means for measuring the temperature of the fuel gas in said chamber;

a second temperature sensing means for measuring a value related to the rate at which the condensable fuel evaporates into the fuel gas;

a wick for conducting the liquid in said receptacle to said second temperature sensing means and means periodically diverting a flow of the liquid from said receptacle to the top of the wick; and means for indicating the difference in the temperature measured by said two temperature sensing means for selectively determining if the fuel gas is maintained at a safe level.

8. The apparatus of claim 7 further including means for maintaining the liquid in said receptacle at a constant level.

9. The apparatus of claim 1 wherein said flow diverting means includes a valve system for normally supplying liquid fuel to said second inlet and a timer for actuating said valve system to inhibit a flow of liquid fuel to said second inlet and divert the fuel to the top of the wick.

10. Apparatus for measuring the degree to which a fuel gas is saturated with a condensable fuel, comprising:

a first temperature sensing device for measuring the temperature of the fuel gas;

a second temperature sensing device for measuring the adiabatic saturation temperature of the condensable fuel which is related to the rate at which the condensable fuel evaporates into the fuel gas;

means for determining a difference between the first measured temperature and the second measured temperature; and means for indicating the determined difference for selectively determining if the fuel gas is maintained at a safe level.

11. The apparatus of claim 10 further including means for adding the condensable fuel into the fuel gas, and means responsive to the determined difference for controlling the rate at which the condensable fuel is added into the fuel gas.

* * * * *